(No Model.) 4 Sheets—Sheet 1.
G. J. LIEZEN.
CHEESE VAT.
No. 593,771. Patented Nov. 16, 1897.
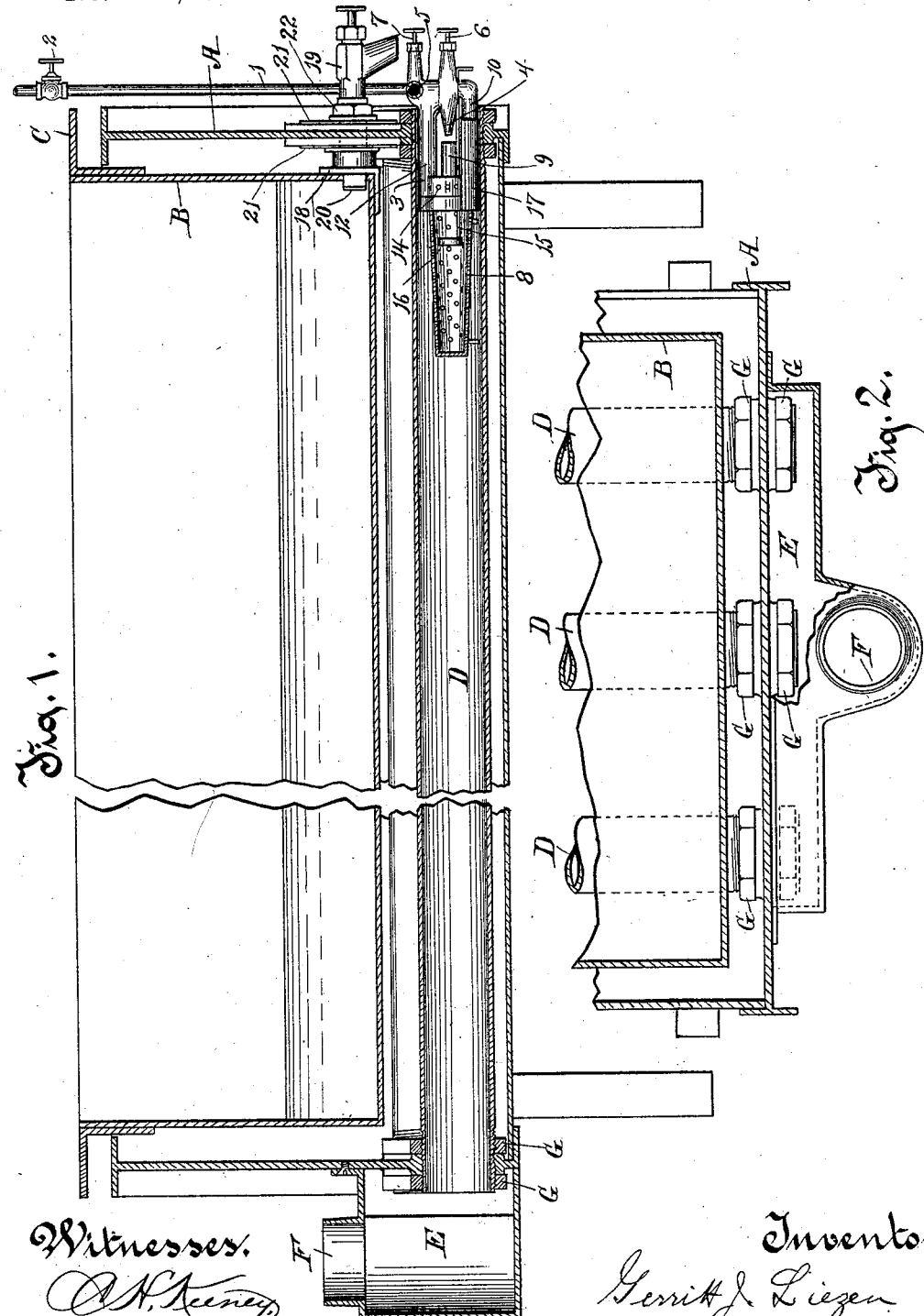
Witnesses.
O. H. Keeney
Anna V. Faust
Inventor
Gerritt J. Liezen
By Benedict & Morsell
Attorneys.

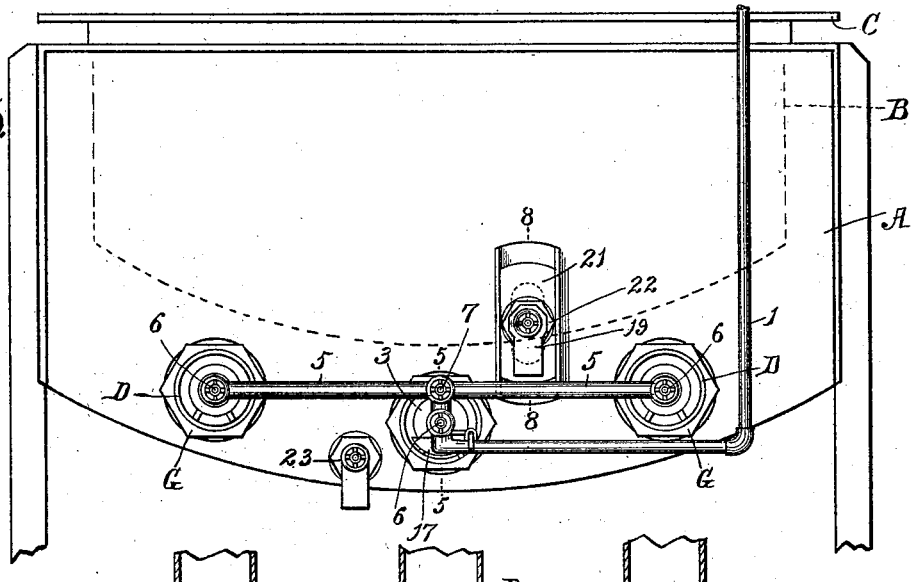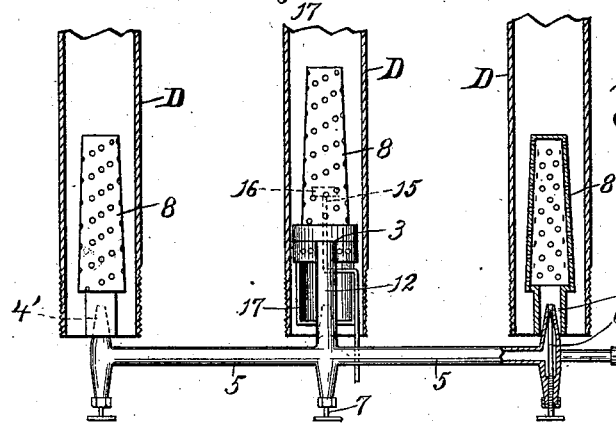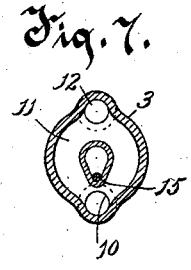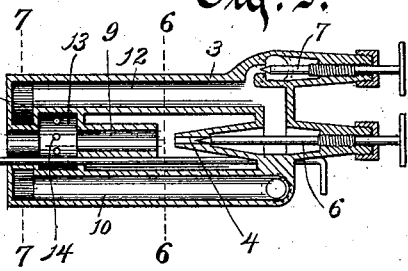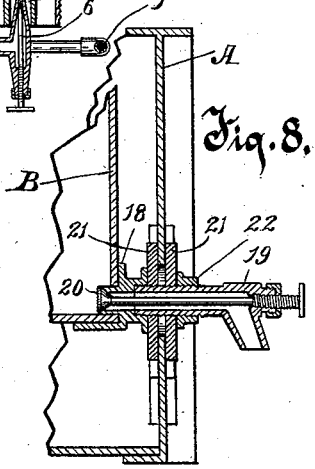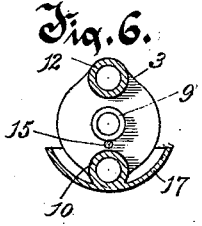

(No Model.) 4 Sheets—Sheet 3.

G. J. LIEZEN.
CHEESE VAT.

No. 593,771. Patented Nov. 16, 1897.

Witnesses.
Inventor.
Gerritt J. Liezen
By Benedict Morsell
Attorneys.

(No Model.) 4 Sheets—Sheet 4.
G. J. LIEZEN.
CHEESE VAT.
No. 593,771. Patented Nov. 16, 1897.
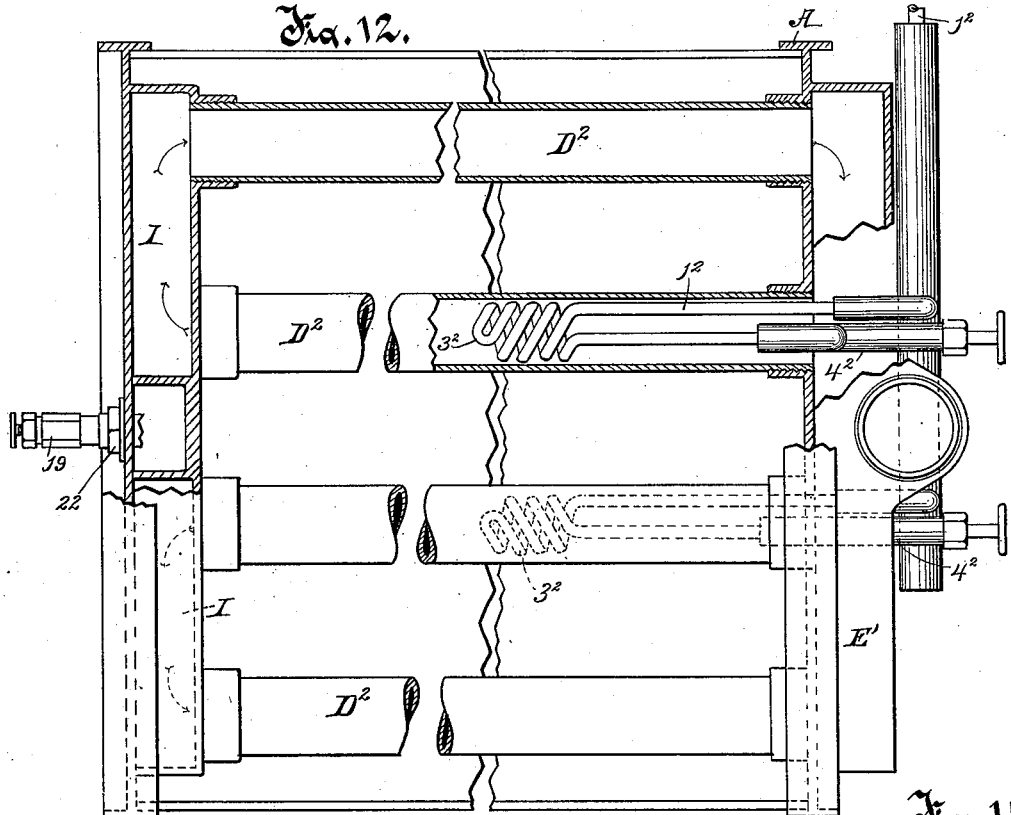
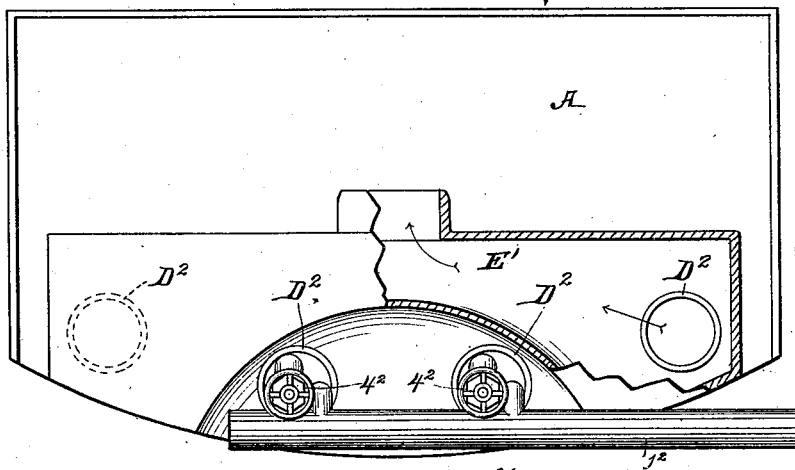
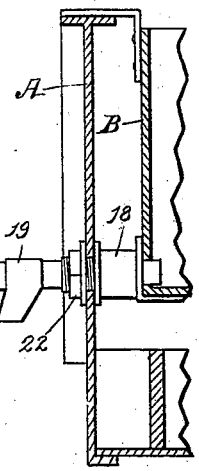
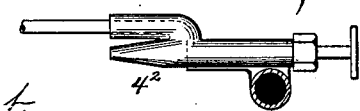
Witnesses. Inventor.

UNITED STATES PATENT OFFICE.

GERRITT J. LIEZEN, OF HINGHAM, WISCONSIN.

CHEESE-VAT.

SPECIFICATION forming part of Letters Patent No. 593,771, dated November 16, 1897.

Application filed March 4, 1896. Serial No. 581,868. (No model.)

*To all whom it may concern:*

Be it known that I, GERRITT J. LIEZEN, of Hingham, in the county of Sheboygan and State of Wisconsin, have invented a new and useful Improvement in Cheese-Vats, of which the following is a description, reference being had to the accompanying drawings, which are a part of this specification.

In the separation and conversion of milk into cheese and the residuum whey it is desirable to raise the temperature of the milk to such height as to cause the separation and conversion to be accomplished comparatively quickly. For this purpose a vat with apparatus adapted for applying heat to the milk is employed.

My invention relates to improved apparatus or devices for heating the milk in connection with the vat and to improvements incidental to the best and most satisfactory use of the vat and the heating devices.

The invention consists of the devices and combinations of devices hereinafter described and claimed or their equivalents.

Figure 9:
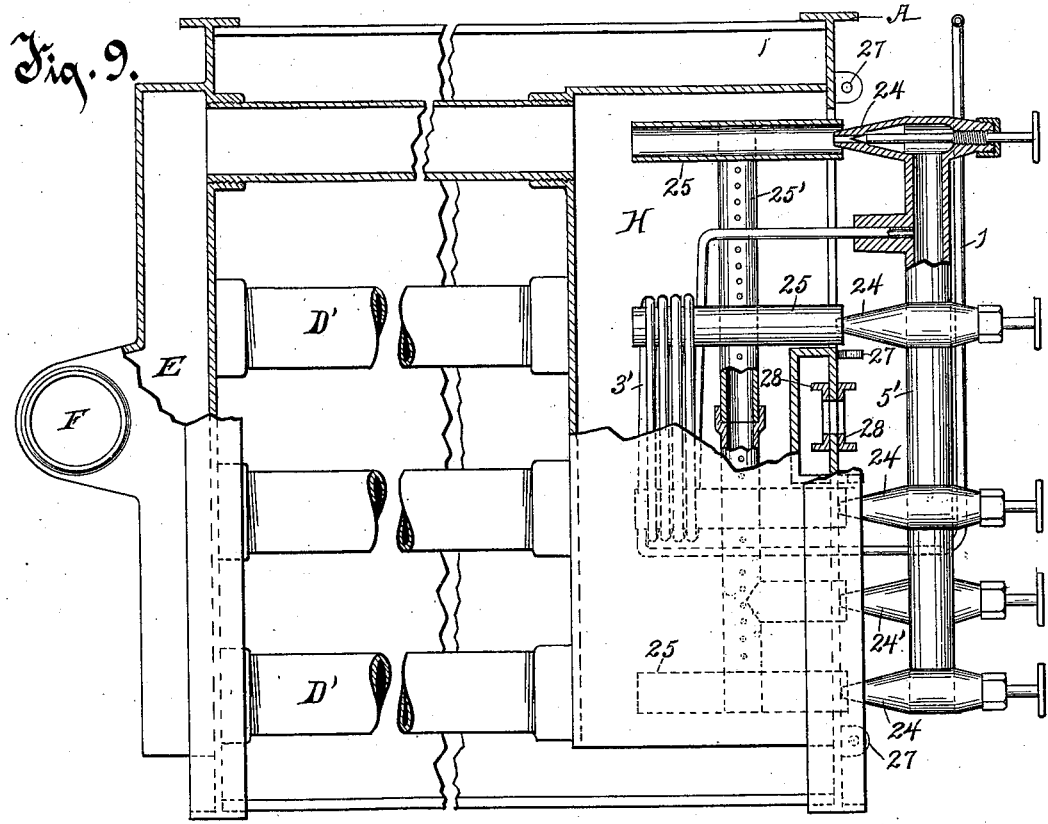
Figure 10:
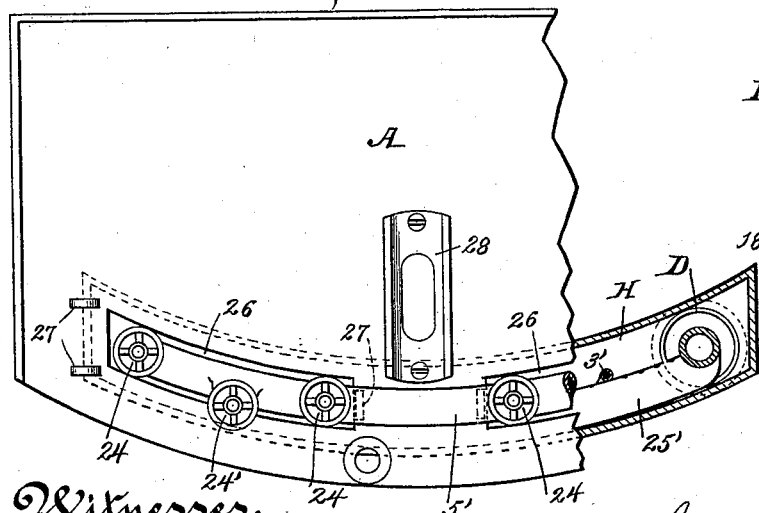
Figure 11:
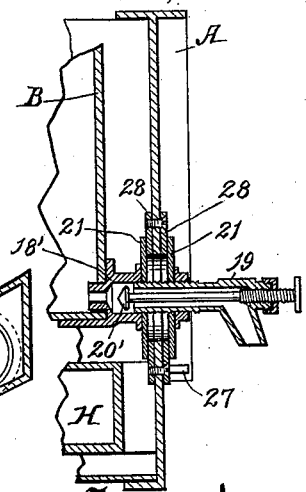

In the drawings, Figure 1 is a longitudinal central vertical section of a cheese-vat with my improved devices in connection therewith, a portion being broken away and omitted for convenience of illustration. Fig. 2 is a plan, partially in section, of a fragment of the rear portion of the vat and devices shown in Fig. 1. Fig. 3 is a front elevation of the structure shown in Fig. 1. Fig. 4 is a plan view, partly in section, of some features of the heating devices partially shown in elevation in Fig. 3. Fig. 5 is a longitudinal section of a feature of the heating apparatus on line 5 5 of Fig. 3. Figs. 6 and 7 are transverse sections on lines 6 6 and 7 7, respectively, of Fig. 5. Fig. 8 is a section on line 8 8 of Fig. 3 of the vat-faucet and its attachments. Fig. 9 is a plan, partly in section, of a modified form of the apparatus. Fig. 10 is a front elevation of the tank, a part being broken away, of the form shown in Fig. 9. Fig. 11 is a section showing a slightly-modified form of the vat or whey-faucet. Fig. 12 is a plan, with parts in section, of another modified form of the construction. Fig. 13 is a front elevation, parts being broken away, of the form of construction shown in Fig. 12. Fig. 14 is a detail of the heating apparatus. Fig. 15 exhibits a modified form of whey-faucet in connection with a stationary vat and tank.

In the drawings, A is a tank supported on suitable legs. The vat B, also preferably constructed of sheet metal, is somewhat smaller in size than the tank A and is preferably provided with a flange C around its edge at the top, which flange normally rests on the top of the tank, permitting the vat to depend therefrom into the tank. When used, water is put into the tank and the vat is lifted thereby and floats therein. The milk to be heated and separated and converted into cheese and whey is put into the vat B.

For heating the water in the tank A the tank is provided with a number of longitudinally-disposed flues D D, fixed permanently in and through the lower portion of the tank A. At the rear end these flues D D are open into a smoke-chamber E, provided with a smoke-discharging orifice F.

This apparatus may be used with wood or other material for producing combustion, but I prefer to employ therewith gas or vapor, advisably such as is readily produced or generated from a volatile kerosene-oil or gasolene. For this purpose I have provided special devices adapted to supply kerosene-oil to convert it into vapor or gas and to accomplish its rapid and satisfactory combustion in the flues D D. A pipe 1, leading from a reservoir to the burners, is adapted by gravity to supply kerosene-oil or gasolene thereto. A shut-off cock 2 is provided to limit and control the supply of the liquid. The pipe 1 leads to the vaporizing device 3, located in this instance in the central flue D, which vaporizing device discharges through a cone 4 into a burner in the same central flue, and also discharges into branch pipes 5 5, leading to cones 4' 4', that discharge into burners in the other flues. The cones 4 4' are provided with needle-valves 6 6, that close the discharge-orifice through these cones, and by which valves the supply of vapor or gas may be limited or stopped. A needle-valve 7 also closes the port leading from the vaporizing device 3 into the branch pipes 5. The needle-valves are provided with stems having screw-threads thereon that turn in corresponding threads in the body of the cones, whereby the valves may be opened and closed. The cones 4 4' discharge, respectively, into elongated perforated tubular burners 8 8, preferably of truncated-cone form and closed at their rear ends. In the instance of the cone 4 it discharges into the burner 8 through an interposed sleeve 9, that extends from the cone through the rear portion of the vaporizing device 3 to the burner 8. In the vaporizing device there is a short horizontal tube 10, leading from the pipe 1 to an annular vaporizing chamber 11, and therefrom a tube 12, extending horizontally above the tube 10, leads to the cone 4 and to the branch pipes 5. The cone 4 is located between the tubes 10 and 12, and the sleeve 9 is located mostly between the same tubes 10 and 12 and leads from near the cone 4 through the center of the annular chamber 11 and discharges into the burner 8. An annular enlarged chamber 13, which is continuous with the passage through the sleeve 9, is provided with radially-disposed burner-openings 14, through which vapor is discharged and at which it burns in the flue D, as will be understood by reference to Figs. 5 and 4. A rod 15 is slidable endwise in bearings therefor in the frame of the vaporizing device and carries on its extremity a cover or plug-valve 16, adapted to fit over the end of the sleeve 9 and practically close it. A pan 17, Fig. 6, suspended under the tube 10 and chamber 11, is adapted to hold a small supply of gasolene for combustion when commencing to use the device to convert the gasolene in the tube 10 and chamber 11 into vapor or gas. It must be understood that the vaporizing device 3 and the several cones 4 4' and the burners 8 are located in the front ends of the several flues D and that there is such space around these burners in the several flues as to permit of air passing freely through the flues from front to rear. In using these devices a small supply of gasolene is placed in the pan 17, and a supply of gasolene is permitted to flow into the tube 10 and through it into the lower portion of the chamber 11. The gasolene in the pan 17 is then lighted and heats the tube 10 and its contents and the contents of chamber 11 to such extent as to vaporize it, the vapor flowing through the tube 12 to the cone 4, which is then opened, and the gas or vapor discharged therefrom is lighted and burns in the sleeve 9, and out through the apertures 14 of the chamber 13, the valve 16 closing the end of the sleeve 9, whereby the vaporization is made more extensive and complete, supplying a sufficient quantity to be delivered to and discharged from the cones 4' 4' through the pipes 5, the valve 7 having been opened therefor. As soon as the combustion has produced sufficient heat in the vaporizing device to thoroughly vaporize the supply of gasolene being delivered thereto the valve 16 is pushed away from the sleeve 9, permitting the vapor and combustion from the cone 4 to mostly pass through the sleeve 9 into the burner 8, where the combustion is intensified and completed.

When the milk contained in the vat B has been separated and converted into curd and whey, it is desirable to be able to draw off a portion or all of the whey, either immediately or from time to time, and for this purpose a properly-constructed faucet is desirable. As the vat floats on the water in the tank A it is liable to rise and fall therein to a certain extent, and to accommodate this rising and falling of the vat and to provide a satisfactory faucet for use in this place I have provided a hollow boss or short tube 18, which is inserted at one end in an aperture therefor in the lower part of the end of the vat, the boss or tube being provided with flanges that fit against the end and bottom of the vat, and the tube 19, having a downwardly-discharging orifice, is secured to the hollow boss 18 and is made continuous therewith. An inwardly-closing valve 20, adapted to close the inner end of the tube 18, is provided with a screw-threaded stem that turns through the outer end of the tube 19, whereby the valve is adapted to be opened and closed. This tube 19 passes through the end of the tank A in a vertically-elongated slot therefor, and disks or plates 21, one on the inside and the other on the outside of the end wall of the tank, are fitted thereto over the slot-aperture and slide vertically on the wall in ways therefor secured to or integral with the end wall of the tank. The slides 21 21 encompass and are secured to the tube 19, making a watertight joint thereabout and also on the end wall of the tank. The outer end of the tube or boss 18 fits against the inner slide 21, and a nut 22, turning by screw-thread on the tube 19, bears against the outer surface of the other plate 21, thus holding them in position, but so that they can slide freely, though watertight, vertically, on the end plate of the tank. This construction permits of the sufficient rise and fall of the vat B to accommodate its rise and fall in the water of the tank. The flues D D are conveniently secured in the tank A by means of nuts G G, turning on the ends of the flues against the inside and outside, respectively, of the end walls of the tank. A cock 23 is provided for discharging the water from the tank.

In Figs. 9 and 10 there is shown a modified form of the heating devices. In this form of construction there is a combustion-chamber H, located in the front end of the tank initial to and continuous into the flues D' D'. The vaporizing devices and burners are located in this initial combustion-chamber instead of being directly in a combustion-flue, as in the preferable and foregoing-described form of construction. In this form of device the supply-pipe 1 runs into the combustion-chamber and is coiled about one or more of the combustion sleeves or burners, forming a vaporizing device 3', and therefrom leads to the vapor-supplying pipe 5'. This supply-pipe is provided with a series of vapor-discharging cones 24 24 24', which several cones 24 discharge into initial sleeves or burners 25, located in the combustion-chamber H and in front of and so as to discharge toward and into the flues D' D'. The cone 24' discharges through a short pipe into the transversely-disposed perforated tube-burner 25', which is also located in the combustion-chamber, and is preferably constructed in sections, so as to be capable of being removed from the combustion-chamber with the other burners and vaporizing device, if desired. It will be understood that the vapor discharged into and burning from the burner 25' is adapted directly to heat the combustion-chamber H and also to vaporize the liquid in the vaporizing device 3', while the vapor that is discharged through the cones 24 goes mostly into the burners 25, which are adapted for delivering the heat and products of combustion almost directly into the flues D', thus making of these flues both combustion and heating spaces, substantially like the flues in the first form of device described. In this form of apparatus the burners and vaporizing device that are located in the combustion-chamber are so constructed and supported in the chamber as to be capable of being removed therefrom without much difficulty, and when so removed the combustion-chamber may be utilized for building a fire therein with wood or other combustible material. It will be noted that there are door-openings 26 through the front end of the tank into the combustion-chamber, and these are provided for removing the burners and vaporizing device shown in the drawings and are adapted for admitting wood or other material to the combustion-chamber when this is used for heating purposes. I have provided ears 27 on the tank adjacent to the door-openings for hanging and securing doors thereon for closing the combustion-chamber when wood or other inflammable material is inserted and burned within the combustion-chamber.

I also provide a modified form of means for connecting the whey-faucet with the tank, which modified form is shown in Figs. 9, 10, and 11. In this form of device I provide removable plates 28, that are detachably secured to the front end of the tank about the elongated vertical slot therein, and these plates are provided with ways in which the slides 21 are adapted to move vertically water-tight. This form of construction permits of connecting the faucet movably with the end of the tank when such end wall is constructed without ways for the slides 21 directly thereon. In this form of device I also show a valve 20', having its seat on the inside of the tube or valve-throat 18', the valve thus being arranged to close against the flow of the liquid.

In Figs. 12, 13, and 14 I show still another modified form of heating apparatus, in which there are four flues $D^2 D^2$, the two inner ones being utilized for the passage of heat and the products of combustion toward the rear of the tank, and the other two are utilized for the passage of the heat and products of combustion on their return toward the front of the apparatus. In this form of device the smoke-chamber E' is located at the front, and connecting flues or chambers I I are provided at the rear that connect the flues $D^2 D^2$ in sets, providing for the outward and return flow of the heat and products of combustion therethrough. In this form of device also the fuel-supply pipe $1^2$ leads by its branches directly into the combustion flues or chambers $D^2$ and is there coiled, forming a vaporizing device $3^2$, and thence it leads back to the cones $4^2$, so disposed as to discharge directly into the flues $D^2$. In this form of device the whey-discharging faucet is preferably located at the rear end of the tank.

In Fig. 15 I have shown a form of whey-discharging faucet involving my peculiar construction except in the absence of the means for permitting of vertical movement of the faucet in the wall of the tank, this particular form of faucet being adapted for use with a vat and tank where the vat is stationary in the tank.

What I claim as my invention is—

1. The combination with a stationary tank, of a vat suspended and adapted to float on water therein and to rise and fall therewith, and a faucet fixed in the vat and projecting through the wall of the tank in a water-tight joint but movably and so as to be raised and lowered with the vat.

2. The combination with a stationary tank, and a vat suspended so as to rise and fall therein, of a faucet fixed in the wall of the vat and projecting movably through a slot in the wall of the tank, and slides secured to the faucet over said slot arranged to move up and down in ways therefor on the wall of the tank.

3. The combination with a vat movable vertically in a tank, of a faucet comprising an inner tube secured to the vat, an outer tube secured to and continuous of the inner tube, a valve closing against the inner tube and having a stem turning by screw-thread through the end of the outer tube.

4. The combination with a tank and a combustion-flue secured to and extending through said tank, of a vaporizing device comprising a liquid holding and vaporizing chamber, a tube leading therefrom to a vapor-discharging cone, the vapor-discharging cone below said vapor-supplying tube leading thereto, and a sleeve provided with radially-discharging burning-orifices leading from near the cone past the vaporizing-chamber.

5. The combination with a tank and a combustion-flue secured to and extending through said tank, of a vaporizing device comprising a liquid holding and vaporizing chamber, a tube leading therefrom to a vapor-discharging cone, the vapor-discharging cone below said vapor-supplying tube leading thereto, a sleeve provided with radially-disposed burning-orifices leading from near the cone past the vaporizing-chamber, a valve adapted to close the rear end of the sleeve, and a tubular perforated burner extending beyond the sleeve into the combustion-flue.

GERRITT J. LIEZEN.

In presence of—
MARTIN HUGHES,
D. T. PHALEN.